3,147,190
STRAIN INDICATORS FOR NUCLEAR REACTOR
FUEL ELEMENTS
David William Williams, Seascale, Cumberland, England, assignor to United Kingdom Atomic Energy Authority, London, England
Filed Sept. 2, 1960, Ser. No. 53,720
Claims priority, application Great Britain Sept. 4, 1959
6 Claims. (Cl. 176—67)

This invention relates to strain indicators for nuclear reactor fuel elements of the kind in which a nuclear fuel member is contained within a protective sheath.

In gas-cooled nuclear reactors having fuel elements of the specified kind, it is desirable to prevent the coolant, particularly where the latter is oxidising in nature (for example, carbon dioxide) from obtaining access to the fuel members through a breach in any of the protective sheaths. Detection of a breach or breaches is conventionally arranged by monitoring the coolant from fuel element channels for fission product activity released through breaches in the protective sheath. However, cases can arise where there is ingress of coolant through a breach in the protective sheath into access with the fuel member with consequent oxidation thereof, without sufficient outleakage of fission products to give readily discernable signal at the monitor, whereby the breach and consequent oxidation remains undetected, possibly with serious consequences.

It is an object of the present invention to provide, inter alea, means whereby localised swelling of the sheaths of nuclear reactor fuel elements of the specified kind can be detected in a nuclear reactor.

According to the invention, a strain indicator for a nuclear reactor fuel element of the specified kind comprises a membe of fissile material and a body enclosing the member of fissile material, said body having a part which, on the body being subjected to strain, is movable to provide an outlet for the escape of fission products from the body. Exposure of the fissile member to unshielded neutron irradiation in a neutronic environment such as a nuclear reactor causes fission products release or a sharp increase in fission product release, which can be detected by conventional methods.

The invention will now be described by way of example with reference to the accompanying drawings wherein.

Figure 1:
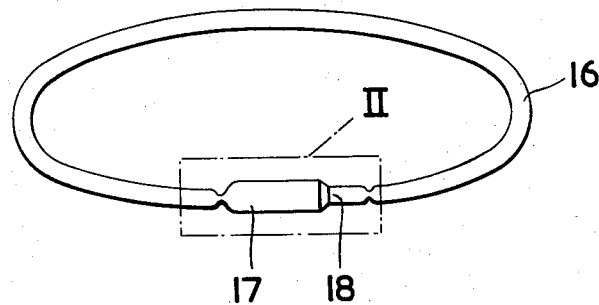
FIG. 1 is a perspective view of an indicator in accordance with the invention.
Figure 2:
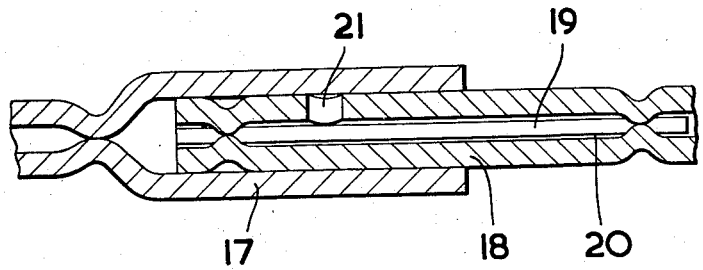
FIG. 2 is an enlarged view in medial section of that part of FIG. 1 within the frame II.
Figure 3:
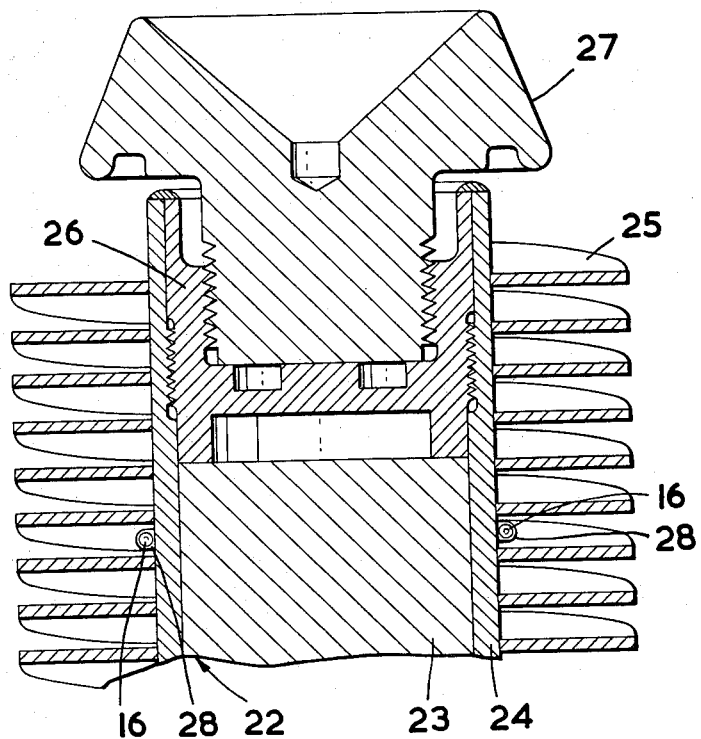
FIG. 3 is a longitudinal section of part of a nuclear reactor fuel element fitted with the strain indicator of FIG. 1.

In FIGS. 1 and 2 of the drawings is shown a strain indicator comprising a flexible stainless steel capillary tube 16 of which one end portion 17 is enlarged in bore so that the other unenlarged end portion 18 of the tube is a push fit in the enlarged end portion when the tube 16 has a circular shape imparted to it. The unenlarged portion 18 of the tube 16 contains a uranium wire 19 which is located by pinching the walls of the tube 16 together about the wire 19 so as to close off the tube 16 and form a chamber 20. An aperture 21 of about 1 sq. mm. cross-sectional area extends through the wall of the chamber 20, and is normally situated inside the enlarged end portion 17 so that it is obturated thereby. The tube 16 is disposed about a nuclear reactor fuel element as shown in FIG. 3. FIG. 3 shows part of a nuclear reactor fuel element 22 comprising a cylindrical uranium fuel rod 23 enclosed in a magnesium alloy sheath 24 having fine-pitched helical heat transfer fins 25 and an end cap 26, welded to the sheath 24 and carrying an end-locating member 27. Apertures 28 are drilled through the roots of some of the fins 25 so that the tube 16 can be threaded through them and extend round the fuel element with the portion 18 fitted within the portion 17. Initially the tube 16 is a loose fit about the fuel element to allow for growth of the fuel element under irradiation in a nuclear reactor but should abnormal growth occur, due to formation of oxide on the uranium fuel rod 23, for example, whilst the element is in the reactor, the ends of the tube 16 will move apart relative to one another and the aperture 21 will eventually move out of the enlarged end portion 17 of the tube 16, exposing the uranium wire 19. Fission products generated in the uranium during irradiation of the fuel element in the reactor will thus be released from the chamber 20 and taken up by the reactor coolant flowing over the fuel element. The presence of the fission products in the coolant can then be detected by conventional coolant activity monitoring means.

Instead of the tube 16 being a loose fit about the fuel element initially, to allow for irradiation growth of the element, the aperture 21 may be situated far enough within the enlarged end portion 17 to avoid exposure of the aperture under normal conditions. The indicator may, of course, also be used to study growth of a fuel element from the start of irradiation, for example, and the initial position of the aperture 21 relative to the enlarged end portion 17 may be adjusted accordingly. The extent to which the aperture 21 is exposed directly affects the release of fission products from the chamber 20 and this fact may be used to determine the magnitude of the strain to which the indicator is being subjected.

The indicator described in relation to the drawings covers only a short length of the fuel element and may be fitted in the region where growth is expected to occur, generally, in the case of oxide formation, near the ends of the fuel rod within the element. Alternatively a number of indicators may be provided along the length of the fuel element. If the strain indicator is fitted to the fuel element to provide an indication of oxidation of the fuel member due to inleakage of reactor coolant a region of preferential initial oxidation may be provided on the fuel member and the strain indicator fitted about that region. The region of preferential initial oxidation may be produced by suitable surface treatment of the uranium fuel rod 23 (for example, nitriding of the rod except for a narrow band at each end) or by drilling one or more blind holes in the rod 23 and filling them with a substance which oxidises in preference to the rod 23 and, on oxidation increases markedly in volume so as to distort the fuel element sheath (for example, uranium-carbon alloy containing at least 500 p.p.m. of carbon).

I claim:

1. For a nuclear reactor fuel element comprising a nuclear fuel member and a protective sheath enclosing the fuel member, a strain indicator comprising a capillary tube of flexible material having one end portion enlarged in bore so that the other end portion of the tube is a push fit within the enlarged end portion when a circular shape is imparted to the tube, a chamber within said other end portion having an outlet obturatable by push fitting the enlarged end of the tube over said other end of the tube, and a member of fissile material contained within the chamber.

2. For a nuclear reactor fuel element comprising a nuclear fuel member and a protective sheath enclosing the fuel member, a strain indicator according to claim 1, wherein the walls of the tube are pinched together to form the chamber within said other end portion of the tube and the fissile material is in the form of a wire held between said pinched walls.

3. A nuclear reactor fuel element comprising a nuclear fuel member and a protective sheath enclosing the fuel member, in combinatiton with a strain indicator therefor fixed to the outside of the fuel element, the strain indicator comprising a member of fissile material and a body, separate from the fuel element, enclosing the member of fissile material, said body having a part which, on the body being subjected to strain, is movable to provide an outlet for the escape of fission products from the body.

4. A nuclear reactor fuel element comprising a nuclear fuel member and a protective sheath enclosing the fuel member, a strain indicator being provided on the fuel element and comprising a capillary tube of flexible material having one end portion enlarged in bore so that the other end portion of the tube is a push fit within the enlarged end portion when a circular shape is imparted to the tube, a chamber within said other end portion having an outlet obturatable by push fitting the enlarged end of the tube over said other end of the tube, and a member of fissile material contained within the chamber.

5. A nuclear reactor fuel element comprising a nuclear fuel member, a region of preferential initial oxidation on the surface of said fuel member and a protective sheath enclosing said fuel member, in combination with a strain indicator therefor fixed to the outside of the fuel element about that part of the sheath which covers said region of preferential initial oxidation and said indicator comprising a member of fissile material and a body enclosing the member of fissile material, said body having a part which, on the body being subjected to strain, is movable to provide an outlet for the escape of fission products from the body.

6. A nuclear reactor fuel element comprising a nuclear fuel member, a region of preferential initial oxidation on the surface of said fuel member and a protective sheath enclosing said fuel member, a strain indicator being provided on the fuel element about that part of the sheath which covers said region of preferential initial oxidation and said indicator comprising a capillary tube of flexible material having one end portion enlarged in bore so that the other end portion of the tube is a push fit within the enlarged end portion when a circular shape is imparted to the tube, a chamber within said other end portion having an outlet obturatable by push fitting the enlarged end of the tube over said other end of the tube, and a member of fissile material contained within the chamber.

References Cited in the file of this patent

UNITED STATES PATENTS

| | | |
|---|---|---|
| 2,777,812 | Powell et al. | Jan. 15, 1957 |
| 2,849,388 | Brugmann | Aug. 26, 1958 |
| 2,855,355 | Ohlinger et al. | Oct. 7, 1958 |
| 2,873,853 | Burton | Feb. 17, 1959 |
| 3,037,924 | Creutz | June 5, 1962 |

OTHER REFERENCES

Nuclear Power, July 1959, pages 77–79.